(12) United States Patent
Kansal et al.

(10) Patent No.: US 12,732,280 B2
(45) Date of Patent: Sep. 8, 2026

(54) DEFAULT TRANSMIT POWER FOR 400ZR OPTICAL TRANSMITTER

(71) Applicant: Juniper Networks, Inc., Sunnyvale, CA (US)

(72) Inventors: Monika Kansal, Karnataka (IN); Nilay Srivastava, Bangalore (IN); Rohan Rastogi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 249 days.

(21) Appl. No.: 18/388,628

(22) Filed: Nov. 10, 2023

(65) Prior Publication Data

US 2025/0158719 A1 May 15, 2025

(51) Int. Cl.
*H04B 10/564* (2013.01)
*H04B 10/40* (2013.01)

(52) U.S. Cl.
CPC ........... *H04B 10/564* (2013.01); *H04B 10/40* (2013.01)

(58) Field of Classification Search
CPC .............................. H04B 10/40; H04B 10/564
USPC ........................................................ 398/135
See application file for complete search history.

(56) References Cited

U.S. PATENT DOCUMENTS 7,269,357 B2 * 9/2007 Case ...................... H04B 10/40 398/130
7,274,911 B2 * 9/2007 Li ......................... H04W 48/18 455/435.3
7,302,186 B2 * 11/2007 Light ................. H04B 10/0799 398/137
7,463,674 B2 * 12/2008 Woolf .................... H04B 10/40 375/219
8,768,166 B2 * 7/2014 Movassaghi ........... H04B 10/40 398/189
8,819,423 B2 * 8/2014 Ekkizogloy ............. G06F 21/10 713/168
9,251,689 B2 * 2/2016 Xiong .................... H04B 10/40
9,577,759 B2 * 2/2017 Aronson ............ H04B 10/0799
10,193,631 B1 * 1/2019 Chen ................... G06F 12/1081
10,980,145 B2 * 4/2021 White .................. H05K 7/1494
11,360,921 B2 * 6/2022 Wang ................. H04Q 11/0005
12,107,629 B2 * 10/2024 Maniloff .............. H04B 10/524
12,438,617 B2 * 10/2025 Rao ........................ H04B 10/40
(Continued)

OTHER PUBLICATIONS

"Implementation Agreement 400ZR", Optical Internetworking Forum, OIF-400ZR-02.0, (Nov. 2022), 123 pgs.
(Continued)

*Primary Examiner* — Dalzid E Singh
(74) *Attorney, Agent, or Firm* — Harrity & Harrity, LLP

(57) ABSTRACT

An optical communication device includes an optical transmitter configured to transmit data over an optical link. The optical communication device also includes a memory having a configuration location of one or more bytes, and one or more registers storing a default transmit power value. The optical communication device also includes a controller configured to access the configuration location. In response to determining that no valid transmit power value is indicated by information stored in the configuration location, the controller accesses the one or more registers to read the default transmit power value, and sets a transmit power level of the optical transmitter to the default transmit power value.

20 Claims, 3 Drawing Sheets

(56) References Cited

U.S. PATENT DOCUMENTS

| | | | | |
|---|---|---|---|---|
| 2009/0279885 | A1* | 11/2009 | Kondo | H04B 10/40 398/25 |
| 2012/0263460 | A1* | 10/2012 | Movassaghi | H04B 10/40 398/38 |
| 2014/0301740 | A1* | 10/2014 | Rope | H04B 10/40 398/135 |
| 2017/0163346 | A1* | 6/2017 | Aronson | G01M 11/30 |
| 2021/0405314 | A1* | 12/2021 | Wingrove | H04B 10/0795 |
| 2024/0259189 | A1* | 8/2024 | Sarwar | H04L 9/0825 |

OTHER PUBLICATIONS

"OpenZR+ Specifications, v. 3.0", [Online]. Retrieved from the Internet: <https://openzrplus.org/resources/openzr-specifications-v-3-0/>, (Sep. 12, 2023), 88 pgs.

"QSFP-DD/QSFP-DD800/QSFP-DD1600 Hardware Specification for QSFP Double Density 8X and QSFP 4X Pluggable Transceivers", Rev 7.0, (Sep. 29, 2023), 140 pgs.

* cited by examiner

DEFAULT TRANSMIT POWER FOR 400ZR OPTICAL TRANSMITTER

TECHNICAL FIELD

The present disclosure generally relates to optical transmitters and more particularly to default transmit power behavior for optical transceivers.

BACKGROUND

Optical transceivers are commonly used in high-speed fiber optic communications networks to transmit and receive data. Standards such as 400GBASE-ZR and OpenZR+ define the requirements and specifications for interoperable 400 Gbps optical transceiver modules. These standards are sometimes referred to as just 400ZR and 400ZR+, or variants like 400G-ZR and 400G-ZR+. 400ZR and 400ZR+ transceivers utilize 16 parallel lanes of PAM04 modulation to achieve aggregate data rates up to 400 Gbps on a single wavelength.

The transmit power (Tx power) of the optical transceiver is an important parameter that must be configured correctly to achieve error-free link operation. Transceiver control settings like the transmit power are typically configured by the host system via digital interfaces like Inter-Integrated Circuit (I2C). However, optical transceivers also contain default settings in internal non-volatile memory that are used if the configured settings are lost or invalid.

BRIEF DESCRIPTION OF THE SEVERAL VIEWS OF THE DRAWINGS

The following description includes discussion of figures having illustrations given by way of example of implementations of embodiments of the disclosure. The drawings should be understood by way of example, and not by way of limitation. As used herein, references to one or more "examples" or "embodiments" are to be understood as describing a particular feature, structure, or characteristic included in at least one implementation of the inventive subject matter, in at least some circumstances. Thus, phrases such as "in one example", "in some examples", "in some embodiments", "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number may refer to the figure ("FIG.") number in which that element or act is first introduced.

Figure 1:
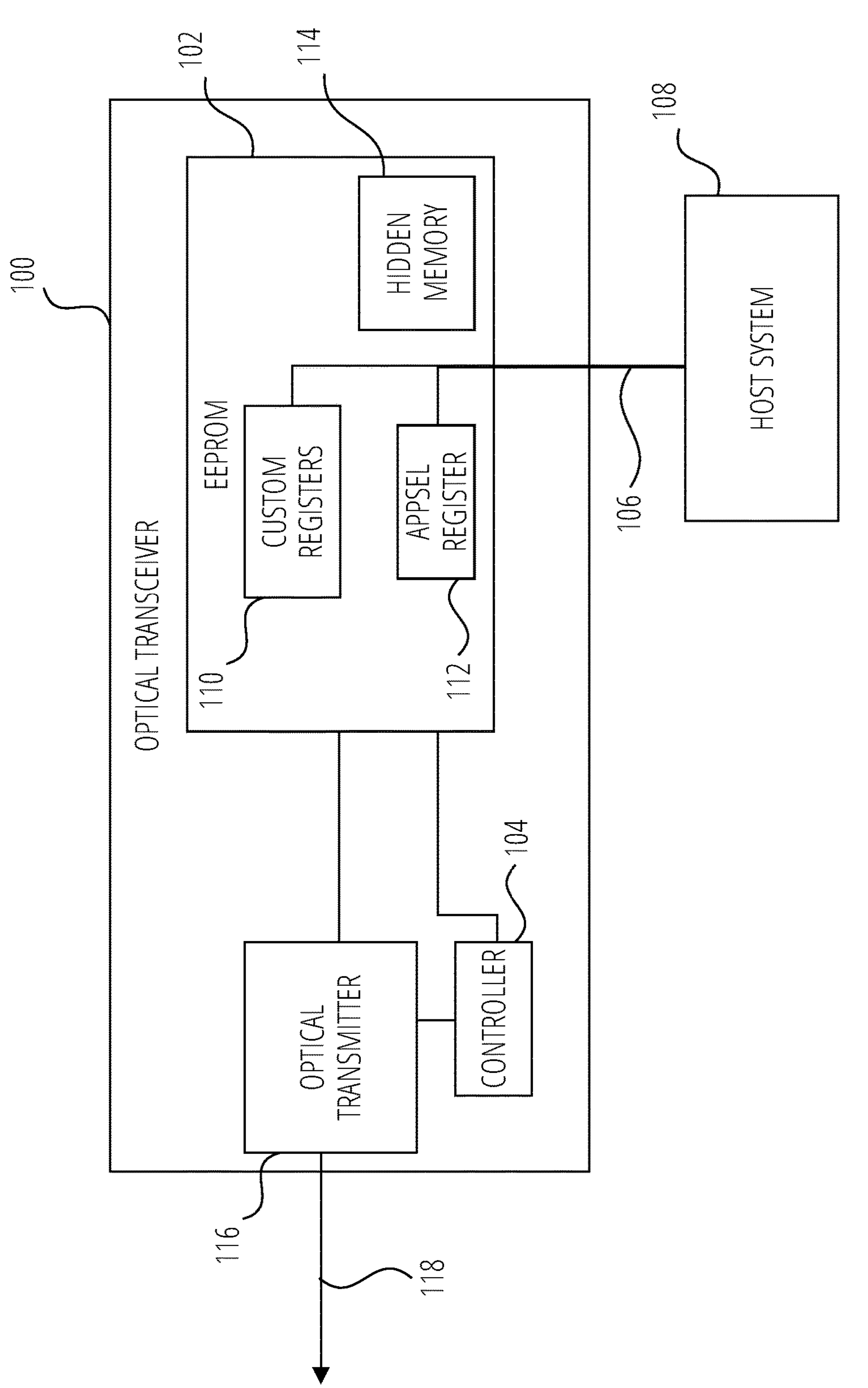
FIG. 1 illustrates a block diagram of an optical transceiver, in accordance with at least one example.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

As described above, the transmit power of an optical transceiver is typically configured by the host system. In some cases, vendors of optical transceivers will offer 400ZR transceivers that conform to the specifications of the relevant standards. These standard modules will have their default transmit power level linked to an Application Selector (AppSel) value. The AppSel value is selected by a user and stored in a register field of an Electrically Erasable Programmable Read-Only Memory (EEPROM) chip of the optical transceiver. A given AppSel value identifies or is associated with a media interface type, such as Ethernet, OTN, Fibre Channel, and so on. The transmit power of the optical transceiver is set to a value based on the selected AppSel value, such that the transmit power conforms to the needs of the selected media interface to ensure link performance. This allows a host system to easily determine the module's interface type by reading the AppSel value, e.g., via an I2C interface.

However, this approach to configuring the transmit power of the optical transceiver can potentially give rise to undesired behavior. If a standard module does not have an AppSel value set, or if the AppSel value is invalid or unsupported by the device, the optical transceiver may fall back on a default transmit power value hard-coded into the device and stored in a user-inaccessible location, e.g., in a hidden memory register of the EEPROM or another internal non-volatile memory.

In some cases, using the hard-coded default transmit power setting may give rise to undesired behavior by the optical transceiver. For example, some modules fall back on a hard-coded transmit power setting that is equal to the maximum supported value for transmit power (e.g., 4 dBm (decibel-milliwatts)). This can result in a range of undesirable consequences, such as failure to establish a working communication link, interference with communications on the network, and even damage to other components of the network. For example, a typical high power alarm threshold for a 400ZR optical receiver is 0 dBm, which is typically well below an optical transceiver's maximum supported value for transmit power.

Various circumstances can give rise to the transmit power configuration being deleted or rendered invalid. First, the transmit power configuration could be deleted or changed to a zero or other invalid value via provisioning actions: for example, a user could manually delete the configuration, a zero touch provisioning event could alter the configuration, or a bulk configuration rollback could remove the settings. Second, chassis replacement from one vendor's equipment to another could lead to the configuration being deleted or rendered invalid. For example, replacing a Cisco™ chassis with a Juniper™ chassis may remove the existing transmit power configuration, because different vendors may use different default values and implementations. Each company's devices could have disparate default configurations for transmit power.

Examples described herein attempt to address this limitation of existing optical transceivers by providing a default setting for transmit power stored in a user-accessible location. The default transmit power is used by the optical transceiver if the normal configuration is lost. In some examples, the default value for transmit power is stored in a set of custom registers of the EEPROM accessible to a user via an I2C interface. This may provide the benefit of allowing a user to directly read out the default transmit power setting via the digital host interface, without needing to delete the configuration and observe the module's behavior. In some examples, the user can also modify the default transmit power value to an arbitrary level, instead of relying on a hard-coded transmit power value or a set of predetermined transmit power values associated with specific media interfaces.

Accordingly, examples described herein may attempt to address one or more technical problems related to optical transceivers. Some examples may enable improved visibility into the default state of the optical transceiver, allowing users to validate that the default transmit power is set to an appropriate level for the application. This may prevent issues with excessively high default power. Overall, storing the default transmit power setting in readable registers may provide enhanced control, observability, and/or safety when operating optical transceivers.

Some examples described herein are consistent with one or more standards or interface specifications, such as the 400NZ implementation agreement (Optical Internetworking Forum, 400ZR Implementation Agreement, OIF-400ZR-02.0 (November 2022), incorporated herein by reference in its entirety), the 400NZ+ implementation agreement (OpenZR+ Specifications, version 3.0 (September 2023), incorporated herein by reference in its entirety), and/or the Quad Small Form Factor Pluggable Double Density (QSFP-DD) standard (QSFP-DD/QSFP-DD800/QSFP-DD1600 Hardware Specification for QSFP DOUBLE DENSITY 8× AND QSFP 4× PLUGGABLE TRANSCEIVERS, Rev 7.0 (September 2023), incorporated herein by reference in its entirety).

FIG. 1 shows a block diagram of an optical transceiver 100. The optical transceiver 100 includes an optical transmitter 116 and an EEPROM 102. The optical transmitter 116 transmits data over an optical link 118 at a transmit power determined by settings of the optical transmitter 116 received from the EEPROM 102.

The EEPROM 102 may be integrated into the optical transceiver 100 module. In some examples, the EEPROM 102 stores non-volatile information, retaining data when power is removed. The EEPROM 102 may store control and/or status registers accessible via an I2C interface 106. The EEPROM 102 may be used to store settings like transmit power, vendor information, the serial number of the optical transceiver 100, and so on. The EEPROM 102 may allow a host system 108 to read and/or write module settings over the I2C interface 106. The EEPROM 102 may contain a defined memory map of different register addresses. The size of the EEPROM 102 may range from 256 bytes to 2 kB, with 1 kB being common. The memory registers of the EEPROM 102 may be organized into pages of 128-256 bytes, with page addressing. In some cases, the EEPROM 102 may be write-protected to prevent accidental changes. The EEPROM 102 may contain factory-set read-only regions with calibration data in some cases. The EEPROM 102 may store default settings to be used if the regular settings are lost, as described herein.

In a first operating mode, the transmit power of the optical transmitter 116 is determined by a value stored in the AppSel register 112 of the EEPROM 102, as described above. Each value of the AppSel register 112 is associated with a corresponding transmit power value, and the optical transmitter 116 is configured to transmit at the transmit power corresponding to the values stored in the AppSel register 112. The value stored in the AppSel register 112 is viewable and modifiable by a host system 108 via an I2C interface 106.

In a second operating mode, no valid value for a media interface is stored in the AppSel register 112. Accordingly, the logic of the optical transceiver 100 (such as a controller 104 and/or various other hardware logic components, such as a processor or an application-specific integrated circuit (ASIC)) retrieves a default transmit power value from a location in its memory and configures the optical transmitter 116 to transmit at the default transmit power value. In some existing approaches, as described above, the optical transceiver 100 may retrieve this default transmit power value from a hidden memory 114 of the EEPROM 102 that is inaccessible to a user. However, the illustrated example instead retrieves the default transmit power value from one or more custom registers 110 of the EEPROM 102. The values stored in the custom registers 110, like the AppSel register 112, are viewable and modifiable via the I2C interface 106 by a user operating the host system 108.

In some examples, the default transmit power value is stored as two bytes in page 01h of the EEPROM 102, which includes 32 bytes of custom registers 110 (e.g., bytes 191-222). In some cases, the EEPROM 102 stores other default values as well, such as two bytes (e.g., bytes 138-139) of page 01h of the EEPROM storing a default wavelength value representing a nominal transmitter output wavelength at room temperature, and specifically representing the center of a wavelength range for controlled wavelength applications. The default wavelength value may be stored as a 16-bit value with, byte 138 as the high order byte and byte 139 as the low order byte. The laser wavelength value of the optical transmitter 116 may be set equal to the 16-bit integer value of the wavelength in nm divided by 20 (units of 0.05 nm).

Similarly, in some examples, the default transmit power value may be stored as 2 bytes of the custom registers 110 (in the range of bytes 191-222 of page 01h). In some examples, the default transmit power value is stored in a portion of the EEPROM 102 used to advertise settings (e.g., in an example consistent with the QSFP-DD interface specification, the default transmit power value may be stored in page 01h of the EEPROM 102 used for Advertising).

In some examples, the configuration of the EEPROM 102 is consistent with the QSFP-DD Common Management Interface Specification (CMIS), Rev 4.0, May 8, 2019, which describes page 01h of the EEPROM 102 as follows:

> 8.4 Page 01h (Advertising) Page 01h contains advertising fields that define properties that are unique to active modules and cable assemblies. The presence of Page 01h is advertised in bit 7 in Page 00h byte 2. All fields on Page 01h are read-only and static.

TABLE 8

| 25 Page 01h Overview | | | |
|---|---|---|---|
| Byte | Size (bytes) | Name | Description |
| 128-131 | 4 | Module Firmware and Hardware revisions | |
| 132-137 | 6 | Supported link length | Supported lengths of various fiber media |
| 138-139 | 2 | Nominal Wavelength | |
| 140-141 | 2 | Wavelength Tolerance | |
| 142-144 | 3 | Implemented Memory Pages and Durations advertising | |
| 145-154 | 10 | Module Characteristics advertising | |
| 155-156 | 2 | Implemented Controls advertising | |
| 157-158 | 2 | Implemented Flags advertising | |
| 159-160 | 2 | Implemented Monitors advertising | |
| 161-162 | 2 | Implemented Signal Integrity Controls advertising | |
| 163-166 | 4 | CDB support advertising | |
| 167-168 | 2 | Additional Durations advertising | |
| 169-175 | 7 | Reserved | |
| 176-190 | 15 | Module Media Lane advertising | |
| 191-222 | 32 | Custom | |
| 223-250 | 28 | Extended Module Host-Media Interface Advertising options | |
| 251-254 | 4 | Reserved | |
| 255 | 1 | Checksum | Checksum of bytes 130-254 |

It will be appreciated that the "Nominal Wavelength" field corresponds to the default wavelength value stored in bytes 138 and 139, and Custom bytes 191-222 corresponds to the custom registers 110.

Figure 2:
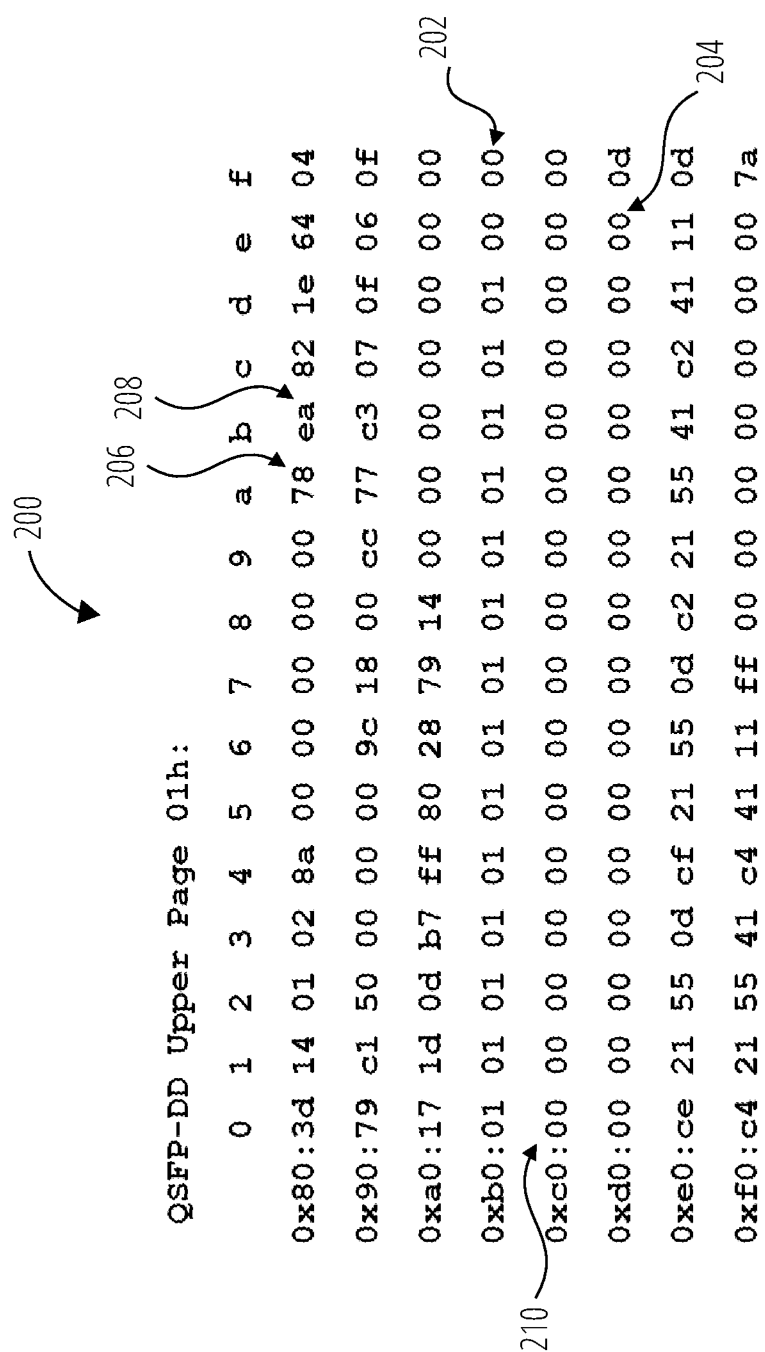
FIG. 2 illustrates an example byte configuration of page 01h of the EEPROM of the optical transceiver of FIG. 1, in accordance with at least one example.

FIG. 2 shows an example byte configuration of page 01h of the EEPROM 102, in accordance with Table 8-25 of the QSFP-DD CMIS reproduced above. Bytes 138 and 139 encoding the Nominal Wavelength value are at byte 08a 206 and byte 08b 208, respectively. The custom registers 110 (Custom bytes 191-222) are at byte 0xbf 202 through byte 0xde 204.

In the illustrated example, the custom registers 110 are shown as storing zero values ("00"). However, in some examples, a default transmit power value may be stored in one or more of the custom registers 110 (e.g., in two bytes of the custom registers 110, such as at byte 0xbf 202 and the immediately subsequent byte 0xc0 210). It will be appreciated that any one or more of the Custom bytes 191-222 of page 01h of the EEPROM 102 may be used to store the default transmit power value.

The value stored in the custom registers 110 for the default transmit power value may be encoded according to various schemes. The default transmit power value may be lower than the maximum transmit power of the optical transceiver 100 (e.g., lower than 4 dBm). In some examples, the default transmit power value is a value that is less than a high power alarm threshold for a 400ZR optical receiver, and/or lower than a high power alarm threshold for a 400ZR+ optical receiver (e.g., lower than 0 dBm). In some examples, the default transmit power value is lower than a high power alarm threshold of a more sensitive component of an optical network (e.g., lower than −10 dBm). Different manufacturers of optical transceivers may set different default transmit power values. In some cases, the type of transceiver (e.g., ZR, ZR+, ZR−HP) may inform the default transmit power value: for example, high power ZR transceivers, such as ZR−HP, high power enterprise (HPE), and high power client (HPC) transceivers, are typically used in contexts requiring high transmit power and may be capable of transmitting at power levels of +15 to +20 dBm, in contrast to non-HP transceivers, which typically have a maximum transmit power level of +5 dBm or lower. Thus, in some cases, a high power transceiver may have its default transmit power value set by the manufacturer to a higher level than a non-high power transceiver.

Figure 3:
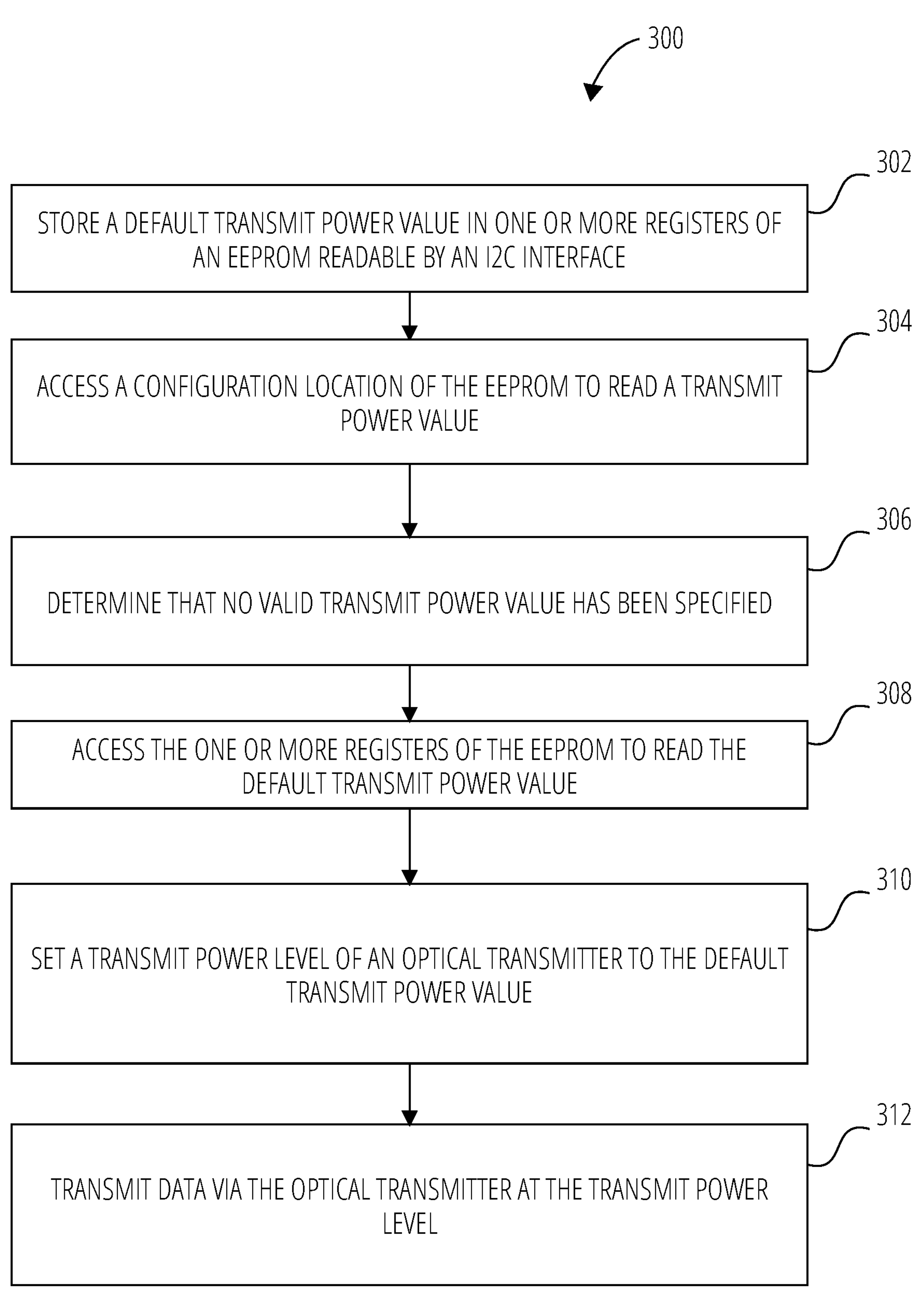
FIG. 3 illustrates a method for setting a default transmit power level of an optical communication device, in accordance with at least one example.

FIG. 3 illustrates an example method 300 for setting a default transmit power level of an optical communication device. In some examples, the optical communication device is an optical transmitter. In some examples, the optical communication device is an optical transceiver, such as optical transceiver 100.

Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method 300 includes storing a default transmit power value in one or more registers of an EEPROM 102 readable by an I2C interface 106 at operation 302. In some examples, the one or more registers where the default transmit power value is stored may be one or more registers of the custom registers 110, as described above. The default transmit power value may be written to the one or more registers of the EEPROM 102 during manufacturing or provisioning of the optical communication device (e.g., the optical transceiver 100).

According to some examples, the method 300 includes accessing a configuration location of the EEPROM to read a transmit power value at operation 304. In some examples, the configuration location is the AppSel register 112, which defines a supported media interface type associated with a transmit power value. In some examples, the configuration location may be a different location of the EEPROM 102 storing a user-defined or vendor-defined value for the transmit power of the optical transceiver 100. The configuration location is accessed by the controller 104 of the optical transceiver 100 (such as a microcontroller, a processor, or an application-specific integrated circuit (ASIC), as described above).

According to some examples, the method 300 includes determining that no valid transmit power value has been specified at operation 306. As described above, the AppSel register 112 may hold a value that has been deleted, or an invalid value (e.g., a value that does not correspond to a media interface type). The controller 104 of the optical communication device may determine the transmit power value to have been lost or deleted, or to be invalid.

According to some examples, the method 300 includes accessing the one or more registers of the EEPROM to read the default transmit power value at operation 308. In response to the controller 104 of the optical communication device determining that there is no valid transmit power value indicated by the data accessed at the configuration location, the controller 104 of the optical communication device may access and read the one or more registers of the EEPROM 102 where the default transmit power value was stored at operation 302.

According to some examples, the method 300 includes setting a transmit power level of an optical transmitter 116 to the default transmit power value at operation 310. The default transmit power value retrieved from the one or more registers (e.g., custom registers 110) by the controller 104 of the optical communication device is used to set the transmit power level of the optical transmitter 116.

According to some examples, the method 300 includes transmitting data via the optical transmitter 116 (e.g., over optical link 118) at the transmit power level at operation 312. The transmit power level, set equal to the default transmit power value at operation 310, is used to transmit data over the optical link 118.

Thus, in some examples, an optical communication device (e.g., optical transceiver 100) is provided that includes an optical transmitter 116 configured to transmit data over an optical link 118. The optical communication device also includes a memory (e.g., non-volatile memory such as EEPROM 102) having a configuration location (e.g., AppSel register 112) including one or more bytes, and one or more registers (e.g., custom registers 110) storing a default transmit power value. The optical communication device also includes a controller 104 configured to access the configuration location. In response to determining that no valid transmit power value is indicated by information stored in the configuration location, the optical communication device accesses the one or more registers to read the default transmit power value, and set a transmit power level of the optical transmitter 116 to the default transmit power value.

In some examples, the controller is further configured to transmit data over the optical link using the optical transmitter transmitting at the transmit power level.

In some examples, the optical transceiver complies with at least one 400ZR or 400ZR+ implementation agreement. The custom registers may be in page 01h of the EEPROM, such as one or more of bytes 191 to 222 of page 01h of the EEPROM.

In some examples, the default transmit power value is less than a maximum transmit power of the optical transceiver. The default transmit power value may less than a high power alarm threshold for a 400ZR optical receiver, such as less than a high power alarm threshold for a 400ZR+ optical receiver.

Examples described herein may thereby provide various techniques for setting a default transmit power level of an optical communication device. By providing the default transmit power value in a user-accessible memory location of the EEPROM, in custom registers made available for defining custom fields, a 400ZR or 400ZR+ compliant optical transceiver may provide greater visibility of transceiver behavior without the need to experiment by changing the configuration of the device. This may reduce the risk of configuring the transceiver into a state that could disrupt the communication network and/or damage the other components of the network.

As used herein, the term "memory" may refer to one or more memory modules or memory types of the optical communication device, such as a non-volatile memory (e.g., the EEPROM 102), and optionally a volatile memory for, e.g., holding interim data for signal processing.

As used herein, the terms "controller" and "logic" may be used to refer to one or more hardware components of an optical communication device, such as an optical transceiver. A 400ZR optical transceiver module contains logic devices to handle the transmit and receive functions, control interfaces, and monitoring capabilities required by the 400ZR specification. In some examples, one or more components of the controller and/or logic may be configured by firmware or other software. In various examples, the controller or logic of an optical transceiver may include one or more components performing various logical and/or processing functions of the optical communication device. A microcontroller or state machine logic may be used to govern the overall operation of the optical transceiver. The microcontroller or state machine may boot up on transceiver module power up, initialize internal components, and implement control loops for functions like transmit power regulation. One or more serializer/deserializer (SerDes) devices may be used to convert between high-speed serial data and parallel interfaces. A transmit SerDes may be used to serialize the input parallel data into a fast serial stream. A receive SerDes may be used to deserialize the incoming serial data into parallel words. A digital signal processor (DSP) may be used to provide flexibility in processing and/or conditioning the high-speed serial data signals. A DSP may provide advanced modulation, pre-emphasis, equalization, framing, and error checking capabilities. One or more analog-to-digital and/or digital-to-analog converters (ADC/DAC) may be used to enable monitoring and control of laser drivers, photodiode inputs, and/or other analog signals. Laser driver circuitry of the optical transmitter 116 may be used to modulate the output of the transmit laser based on input serial data. Receiver circuitry may be used to amplify and digitize an incoming photodiode signal.

In view of the disclosure above, various examples are set forth below. It should be noted that one or more features of an example, taken in isolation or combination, should be considered within the disclosure of this application.

The following are example embodiments:

Example 1 is an optical communication device comprising: an optical transmitter configured to transmit data over an optical link; a memory comprising: a configuration location comprising one or more bytes; and one or more registers storing a default transmit power value; and a controller configured to: access the configuration location; and in response to determining that no valid transmit power value is indicated by information stored in the configuration location: access the one or more registers to read the default transmit power value; and set a transmit power level of the optical transmitter to the default transmit power value.

In Example 2, the subject matter of Example 1 includes, wherein the controller is further configured to transmit data over the optical link using the optical transmitter transmitting at the transmit power level.

In Example 3, the subject matter of Example 2 includes, wherein: the memory comprises a non-volatile memory comprising the one or more registers.

In Example 4, the subject matter of Example 3 includes, wherein: the non-volatile memory comprises an electrically erasable programmable read-only memory (EEPROM).

In Example 5, the subject matter of Example 4 includes, wherein: the one or more registers are custom registers of the EEPROM.

In Example 6, the subject matter of Example 5 includes, wherein: the optical communication device is an optical transceiver.

In Example 7, the subject matter of Example 6 includes, wherein: the optical transceiver complies with at least one 400ZR or 400ZR+ implementation agreement.

In Example 8, the subject matter of Example 7 includes, wherein: the custom registers are in page 01h of the EEPROM.

In Example 9, the subject matter of Example 8 includes, wherein: the custom registers are in one or more of bytes 191 to 222 of page 01h of the EEPROM.

In Example 10, the subject matter of Example 9 includes, wherein: the default transmit power value is less than a maximum transmit power of the optical transceiver.

In Example 11, the subject matter of Example 10 includes, wherein: the default transmit power value is less than a high power alarm threshold for a 400ZR optical receiver.

In Example 12, the subject matter of Examples 10-11 includes, wherein: the default transmit power value is less than a high power alarm threshold for a 400ZR+ optical receiver.

Example 13 is an electrically erasable programmable read-only memory (EEPROM) for an optical transceiver compliant with at least one 400ZR or 400ZR+ implementation agreement, the EEPROM comprising: one or more registers storing a default transmit power value, the one or more registers being custom registers of page 01h the EEPROM.

In Example 14, the subject matter of Example 13 includes, wherein: the custom registers are in one or more of bytes 191 to 222 of page 01h of the EEPROM.

In Example 15, the subject matter of Example 14 includes, wherein: the default transmit power value is less than a maximum transmit power of the optical transceiver.

In Example 16, the subject matter of Example 15 includes, wherein: the default transmit power value is less than an high power alarm threshold for a 400ZR optical receiver.

In Example 17, the subject matter of Examples 15-16 includes, wherein: the default transmit power value is less than an high power alarm threshold for a 400ZR+ optical receiver.

Example 18 is a method of configuring an optical transceiver compliant with at least one 400ZR or 400ZR+ implementation agreement, the method comprising: accessing a configuration location of a memory of the optical transceiver; and in response to determining that no valid transmit power value is indicated by information stored in the configuration location: accessing one or more registers of an electrically erasable programmable read-only memory (EEPROM) of the memory to read a default transmit power value stored in the one or more registers; and setting a transmit power level of an optical transmitter of the optical transceiver to the default transmit power value.

In Example 19, the subject matter of Example 18 includes, transmitting data over an optical link using the optical transmitter set to the transmit power level.

In Example 20, the subject matter of Example 19 includes, wherein: the one or more registers are custom registers in one or more of bytes 191 to 222 of page 01h of the EEPROM.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. An optical communication device comprising:
an optical transmitter configured to transmit data over an optical link;
a memory comprising:
a configuration location comprising one or more bytes; and
one or more registers storing a default transmit power value; and
a controller configured to:
access the configuration location; and
in response to determining that no valid transmit power value is indicated by information stored in the configuration location:
access the one or more registers to read the default transmit power value; and
set a transmit power level of the optical transmitter to the default transmit power value.

2. The optical communication device of claim 1, wherein the controller is further configured to transmit data over the optical link using the optical transmitter transmitting at the transmit power level.

3. The optical communication device of claim 2, wherein:
the memory comprises a non-volatile memory comprising the one or more registers.

4. The optical communication device of claim 3, wherein:
the non-volatile memory comprises an electrically erasable programmable read-only memory (EEPROM).

5. The optical communication device of claim 4, wherein:
the one or more registers are custom registers of the EEPROM.

6. The optical communication device of claim 5, wherein:
the optical communication device is an optical transceiver.

7. The optical communication device of claim 6, wherein:
the optical transceiver complies with at least one 400ZR or 400ZR+ implementation agreement.

8. The optical communication device of claim 7, wherein:
the custom registers are in page 01 h of the EEPROM.

9. The optical communication device of claim 8, wherein:
the custom registers are in one or more of bytes 191 to 222 of page 01 h of the EEPROM.

10. The optical communication device of claim 9, wherein:
the default transmit power value is less than a maximum transmit power of the optical transceiver.

11. The optical communication device of claim 10, wherein:
the default transmit power value is less than a high power alarm threshold for a 400ZR optical receiver.

12. The optical communication device of claim 10, wherein:
the default transmit power value is less than a high power alarm threshold for a 400ZR+ optical receiver.

13. An electrically erasable programmable read-only memory (EEPROM) for an optical transceiver compliant with at least one 400ZR or 400ZR+ implementation agreement, the EEPROM comprising:
an application register storing information accessible by a controller of the optical transceiver, wherein the information indicates at least a transmit power value associated with a media interface type supported by the optical transceiver; and
one or more registers storing a default transmit power value for the optical transceiver, the one or more registers being custom registers of page 01 h of the EEPROM, and wherein the default transmit power is based at least in part on a type of the optical transceiver.

14. The EEPROM of claim 13, wherein:

the custom registers are in one or more of bytes 191 to 222 of page 01 h of the EEPROM.

15. The EEPROM of claim 14, wherein:

the default transmit power value is less than a maximum transmit power of the optical transceiver, and the type of the optical transceiver comprises a 400ZR optical transceiver type, a 400ZR+ optical transceiver type, or a high power ZR transceiver type.

16. The EEPROM of claim 15, wherein:

the default transmit power value is less than a high power alarm threshold for a 400ZR optical receiver.

17. The EEPROM of claim 15, wherein:

the default transmit power value is less than a high power alarm threshold for a 400ZR+ optical receiver.

18. A method of configuring an optical transceiver compliant with at least one 400ZR or 400ZR+ implementation agreement, the method comprising:

accessing a configuration location of a memory of the optical transceiver; and in response to determining that no valid transmit power value is indicated by information stored in the configuration location:

accessing one or more registers of an electrically erasable programmable read-only memory (EEPROM) of the memory to read a default transmit power value stored in the one or more registers; and setting a transmit power level of an optical transmitter of the optical transceiver to the default transmit power value.

19. The method of claim 18, further comprising:

transmitting data over an optical link using the optical transmitter set to the transmit power level.

20. The method of claim 19, wherein:

the one or more registers are custom registers in one or more of bytes 191 to 222 of page 01 h of the EEPROM.

* * * * *